(12) United States Patent
Greis et al.

(10) Patent No.: US 7,333,917 B2
(45) Date of Patent: Feb. 19, 2008

(54) NOVELTY DETECTION SYSTEMS, METHODS AND COMPUTER PROGRAM PRODUCTS FOR REAL-TIME DIAGNOSTICS/PROGNOSTICS IN COMPLEX PHYSICAL SYSTEMS

(75) Inventors: Noel P. Greis, Chapel Hill, NC (US); Jack G. Olin, Chapel Hill, NC (US); Manuel Aparicio, IV, Chapel Hill, NC (US)

(73) Assignees: The University of North Carolina at Chapel Hill, Chapel Hill, NC (US); Saffron Technology, Inc., Morrisville, NC (US)

( * ) Notice: Subject to any disclaimer, the term of this patent is extended or adjusted under 35 U.S.C. 154(b) by 0 days.

(21) Appl. No.: 11/463,448

(22) Filed: Aug. 9, 2006

(65) Prior Publication Data

US 2007/0038838 A1 Feb. 15, 2007

Related U.S. Application Data

(60) Provisional application No. 60/707,272, filed on Aug. 11, 2005.

(51) Int. Cl.
G06F 11/30 (2006.01)
G21C 17/00 (2006.01)

(52) U.S. Cl. ...................... 702/183; 702/184
(58) Field of Classification Search .............. 702/183, 702/184
See application file for complete search history.

(56) References Cited

U.S. PATENT DOCUMENTS

| | | | |
|---|---|---|---|
| 6,446,027 B1* | 9/2002 | O'Keeffe et al. ........... 702/183 |
| 6,581,049 B1 | 6/2003 | Aparicio, IV et al. | |
| 6,745,151 B2 | 6/2004 | Marko et al. | |
| 7,016,886 B2 | 3/2006 | Cabana et al. | |
| 7,027,953 B2* | 4/2006 | Klein ........................ 702/184 |
| 2003/0065482 A1* | 4/2003 | Bechhoefer ................. 702/183 |
| 2003/0139908 A1* | 7/2003 | Wegerich et al. ........... 702/183 |
| 2005/0163347 A1 | 7/2005 | Aparicio, IV et al. | |
| 2006/0095653 A1 | 5/2006 | Fleming et al. | |

OTHER PUBLICATIONS

U.S. Appl. No. 11/426,520, filed Jun. 26, 2006, Aparicio, IV.
U.S. Appl. No. 11/196,871, filed Aug. 4, 2005, Lemen et al.

(Continued)

*Primary Examiner*—John Barlow
*Assistant Examiner*—Victor J. Taylor
(74) *Attorney, Agent, or Firm*—Myers Bigel Sibley & Sajovec, P.A.

(57) ABSTRACT

Sensors are configured to repeatedly monitor variables of a physical system during its operation. A novelty detection system is responsive to the sensors and is configured to repeatedly observe into an associative memory, states of associations among the variables that are repeatedly monitored, during a learning phase. The novelty detection system is further configured to thereafter observe at least one state of associations among the variables that are sensed relative to the states of associations that are in the associative memory, to identify a novel state of associations among the variables. The novelty detection system may determine whether the novel state is indicative of normal operation or of a potential abnormal operation. Multiple layers of learning for real-time diagnostics/prognostics also may be provided.

17 Claims, 11 Drawing Sheets

OTHER PUBLICATIONS

U.S. Appl. No. 11/035,472, filed Jan. 14, 2005, Aparicio, IV et al.

Jaw et al. "Mathematical Formulation of Model-Based Methods for Diagnostics and Prognostics" *Proceedings of GT2006 ASMA Turbo Expo 2006; Power for Land, Sea and Air*, Barcelona, Spain (2006).

Kothamasu et al. "System health monitoring and prognostics—a review of current paradigms and practices" *Int. J. Adv. Manuf. Technol.* 28:1012-1024 (2006).

Li et al. "Neural network representation of fatigue damage dynamics" *Smart Mater. Struct.* 4:126-133 (1995).

Lin. "A survey of signal processing and decision technologies for CBM" Aug. 23, 2006, http://www.omdec.com/cgi-bin/moxle/Technical/Optimizing_CBM/SurveyCBM.shtml.

Schwabacher. "A Survey of Data-Driven Prognostics" *AAIA Infotech@Aerospace Conference*, Arlington, Virginia (2005).

Sutherland et al. "Prognostics, A New Look at Statistical Life Prediction for Condition-Based Maintenance" *Proceedings of IEEE Aerospace Conference*(2003).

Walia et al. "An Intelligent Immune Agent Management System for Facilitating e-Diagnosis in Manufacturing" $3^{rd}$ *IEEE International Conference on Industrial Informatics*(*INDIN '05*) (2005).

Yam et al. "Intelligent Predictive Decision Support System for Condition-Based Maintenance" *Int. J. Adv. Manuf. Technol.* 17:383-391 (2001).

\* cited by examiner

Example: Transient Effects

Example: Incomplete Training

Example: Persistent Non-Normal Mode

Example: Change in Ambient Operating Conditions That Shifts/ Extends Normal Envelope

NOVELTY DETECTION SYSTEMS, METHODS AND COMPUTER PROGRAM PRODUCTS FOR REAL-TIME DIAGNOSTICS/PROGNOSTICS IN COMPLEX PHYSICAL SYSTEMS

CROSS-REFERENCE TO PROVISIONAL APPLICATION

This application claims the benefit of Provisional Application Ser. No. 60/707,272, filed Aug. 11, 2005, entitled In-The-Loop Novelty Detection Systems, Methods and Computer Program Products For Real-Time Diagnostics And Prognostics In Complex Physical Systems, assigned to the assignee of the present application, the disclosure of which is hereby incorporated herein by reference in its entirety as if set forth fully herein.

FIELD OF THE INVENTION

This invention relates to computer systems, methods and/or computer program products, and more particularly to systems, methods and/or computer program products that are capable of performing real-time diagnostics/prognostics on complex physical systems.

BACKGROUND OF THE INVENTION

Diagnostic and prognostic systems, methods and computer program products are widely used to monitor, interpret and/or predict the health of a physical system. As is well known to those having skill in the art, diagnostics refers to determining the state of a part, component, subsystem or system with respect to its ability to perform its function according to design-intended parameters, whereas prognostics refers to predictive diagnostics which includes determining the remaining life, anticipated operational time-to-failure, and/or failure trajectory of a part, component, subsystem or system. In general, conventional diagnostic systems may use physical models of the physical system and/or predetermined nominal limits of sensor values to determine the health of the physical system. A typical scenario in the automotive industry may involve the onboard retention of diagnostic data, such as misfire flops in automotive engine control applications, followed by batch downloads of diagnostic information to base stations for further analysis and logistics decision support.

Conventional techniques that use predetermined normal limits of sensor values may use electronic lookup tables. Thus, current observations of sensor values may be compared against a lookup table of case-based histories of known behaviors. During field operations, baseline states of the system may be recorded as either normal or abnormal. Observed states are then compared with the historical states to determine whether they have been seen before and whether they are normal or not. While this approach can be performed quickly enough for relatively well behaved operations, it may not be suitable to complex behaviors, especially in changing environments when new behavior may be observed that is not in the library of observed states. Moreover, lookup table-based analysis may become exceedingly complex as the complexity of the physical system increases. The experimental baseline determination for vehicles, for example, may assume that all possible states encountered in the field can be predicted and captured in lookup tables for real-time diagnostics and prognostics. Moreover, pre-established lookup tables also may be based on vehicle platform averages, and may not provide granularity for individual vehicles. Finally, cross-sensor associations may be difficult to capture in conventional lookup tables.

Many other diagnostics and primitive prognostics techniques may be based on physical models that describe normal behavior under a range of different input parameters. For example, engine management might be based on physical modeling in the form of a set of equations, which may involve, for example, pressure, temperature and other variables. Such physical models, using a "reductionist" approach, may often be constrained to small parameter sets for mathematical tractability. As a result, comprehensive physical modeling for diagnostics of complex systems may be difficult, if not impossible. As an alternative to physical models, statistical approaches like neural computing may be used in some applications for pattern recognition. In these approaches, large data sets of attributes are obtained through observation of the system, usually during a test-and-validation stage. This data may then be used to fit statistical models that can be used to determine whether an observed state is "normal". These techniques may require large data sets for model fitting, may not be adaptable over time and may be computationally prohibitive in a real-time environment.

Several potential difficulties may be associated with the use of the above approaches for complex systems and/or for real-time diagnostics. In particular, comprehensive physical modeling of complex systems for real-time applications may be difficult if not impossible, and the computational requirements may well be prohibitive. Moreover, the experimental baseline determination on sample physical systems may assume all possible states encountered in the field can be predicted and captured in lookup tables for real-time diagnostics and/or prognostics, and that the results are representative of an entire fleet of systems. Aging phenomena during real world operation also may be difficult to anticipate, since aging patterns are biased by history of individual use, and may not be easily extrapolated. Moreover, batch downloads from a complex system can add response delay and make real-time diagnostics difficult.

In summary, real-time diagnostics/prognostics during field operation may use continuous comparison and interpretation of the current system states with respect to design-intended performance baselines. Practical development of such onboard diagnostics may be hampered by the lack of analytical tools that are fast enough to keep up with the physical process in real-time, especially in the case of large, complex systems, where physical models may not be practically possible.

SUMMARY OF THE INVENTION

Some embodiments of the present invention provide diagnostic/prognostic systems for a physical system, wherein a plurality of sensors is configured to repeatedly monitor variables of the physical system during operation. In some embodiments, the monitoring may be continuous and/or periodic. A first associative memory is provided that is configured to learn associations of sensor values. A novelty detection system also is provided, that is responsive to the plurality of sensors and that is configured to repeatedly observe into the first associative memory, states of associations among the variables that are repeatedly monitored, during a learning phase. The novelty detection system is further configured to thereafter imagine at least one state of associations among the variables that are monitored relative to the states of associations that are observed in the first associative memory, to identify a novel state of associations among the variables. Accordingly, the novelty detection system may be configured to track the outputs of the plurality of sensor values and their associations, comparing them to previously learned associations in the first associative memory, and identifying novel (i.e., not previously learned) associations. In some embodiments, the novelty detection system is further configured to determine whether the novel state is indicative of normal operation or of a potential abnormal operation. In still other embodiments, the novelty detection system may be further configured to observe the novel state that is indicative of normal operation into the associative memory.

In some embodiments, the variables that are repeatedly monitored may be assigned to simple or "fuzzified" bins, and the novelty system may be configured to repeatedly observe into the associative memory, states of associations among the binned variable values, during the learning phase. Binning and/or fuzzification may be applied to continuous and/or discrete variables. Other embodiments of the present invention may provide sensor output pattern completion in case of sensor failure. Such pattern completion may provide limp-home capability by feeding to controllers sensor values for proper operation.

In still other embodiments of the invention, a second associative memory also is provided that includes therein associations of attributes of failure modes of the physical system. A failure mode learning system is also provided that is responsive to the novelty detection system and to the second associative memory. The failure mode learning system is configured to imagine attributes of the novel state relative to the associations of attributes of failure modes of the physical system, to identify and/or predict a potential failure mode for the physical system. In other embodiments, the failure mode learning system may be further configured to identify and/or learn a new failure mode for subsequent associations. In still other embodiments of the invention, a trend learning-enabled prognostic system is provided that is configured to imagine time-line-based associations based on previously learned time-stamped patterns. In these embodiments, the time-stamped associations may also be observed into the second associative memory of attributes of failure modes to enable prognostics.

In yet other embodiments of the present invention, a third associative memory is also provided that includes therein associations of attributes of previous corrective actions and/or responses to failure modes of the physical system. An intervention learning system also is provided, that is responsive to the failure mode learning system and to the third associative memory. The intervention learning system is configured to observe the attributes of the potential failure mode relative to the responses in the third associative memory, to identify a potential corrective action and/or response to the potential failure mode. In some embodiments, the intervention learning system is further configured to apply the potential response to the physical system in real-time. In other embodiments, the novelty detection system, the failure mode learning system, the intervention learning system and the first, second and third associative memories operate on the physical system in real-time.

Still other embodiments of the present invention provide a diagnostic/prognostic system for a physical system that includes a plurality of sensors that are configured to repeatedly monitor physical system variables during operation. The diagnostic/prognostic system includes a novelty detection system, a failure mode learning system and an intervention system. The novelty detection system is responsive to the plurality of sensors and is configured to identify a novel state among the sensor values that is indicative of a potential abnormal operation. The failure mode learning system is responsive to the novelty detection system, and is configured to identify potential failure modes for the physical system in response to the novel state. The failure mode learning system may include a trend learning system that is responsive to the novelty detection system and is configured to identify and learn failure trends for prognostics. The intervention system is responsive to the failure mode system and is configured to identify a potential response and/or corrective action to the potential failure mode.

Embodiments of the invention have been described above in connection with diagnostic/prognostic systems for a physical system. However, analogous diagnostic/prognostic methods and computer program products may also be provided according to other embodiments of the present invention. Moreover, embodiments of the invention that are described herein may be used in various combinations and subcombinations.

DETAILED DESCRIPTION

Figure 1:
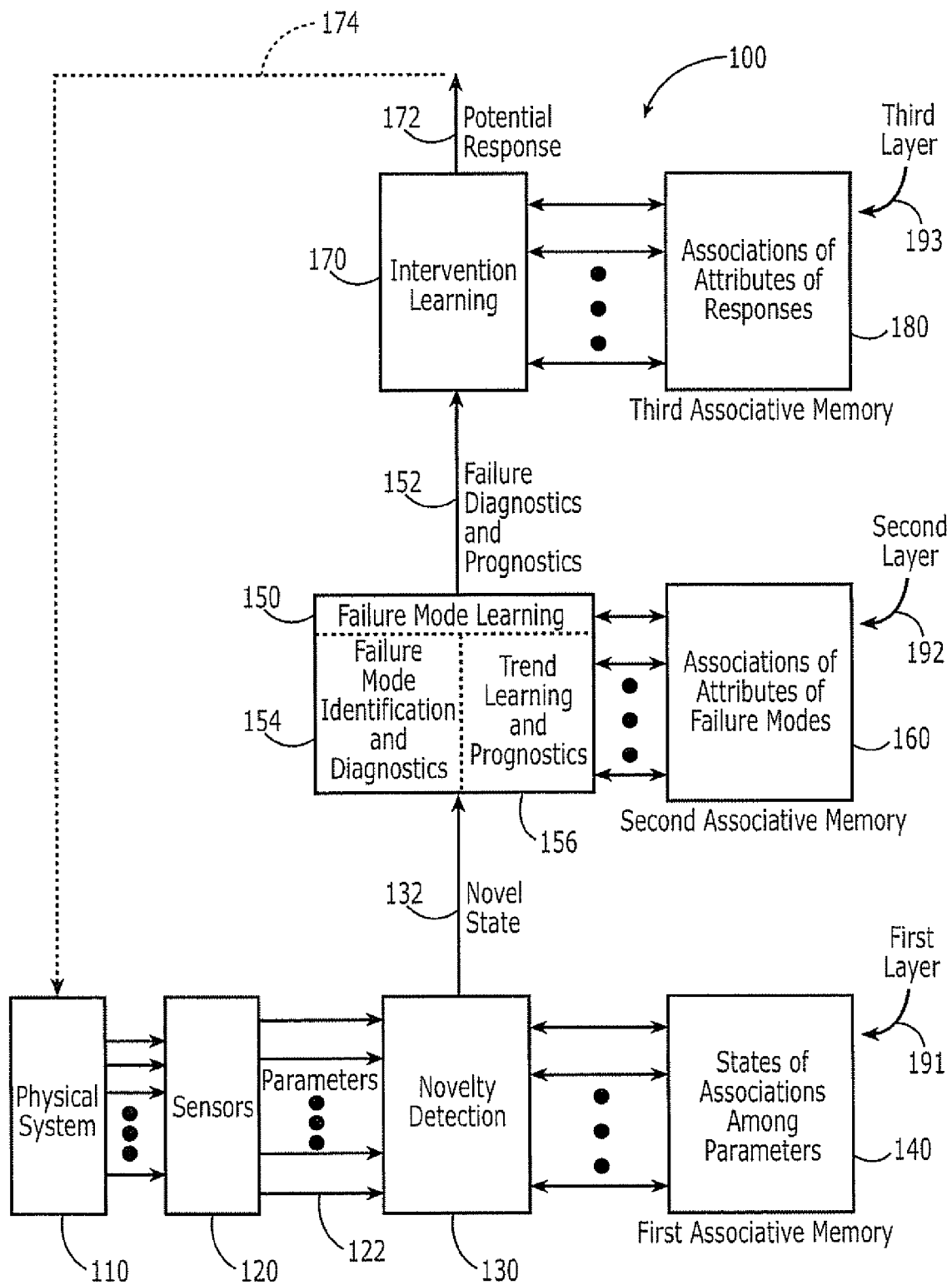
FIG. 1 is a block diagram of diagnostic/prognostic systems, methods and/or computer program products according to various embodiments of the present invention.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element, or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and flowcharts of methods, systems and computer program products according to embodiments of the invention. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks. It will also be understood that, in many systems that are already equipped with some form of microprocessor-based computational capability, the blocks of the block diagram may be embedded within operating and/or application programs that execute on the microprocessor.

FIG. 1 is a block diagram of diagnostic/prognostic systems, methods and/or computer program products according to various embodiments of the present invention. These diagnostic/prognostic systems, methods and/or computer program products 100 may be used to monitor and/or predict the health of a physical system 110. As used herein, a physical system may include an individual physical component, such as a motor or engine, or a more complex and dynamic physical system, such as an entire manufacturing system, power system, transportation system, supply chain and/or other complex systems that are characterized by interrelated subsystems with large numbers of operating parameters and multiple modes of operation that depend dynamically on the physical operating environment. Such real-time system health and trend characterization not only can enable condition-based maintenance and repair, but can also provide real-time decision support to a supply chain, command and control, engineering, research and development, and/or other operations. A plurality of sensors 120 may be configured to repeatedly monitor variables 122 of the physical system 110 in operation. In some embodiments, monitoring may take place continuously and/or periodically. The design and operation of sensors 120 can vary widely, depending on the physical system and/or the variables being monitored, as is well known to those having skill in the art. Signal conditioning, aggregating, pre-processing, post-processing and/or other operations also may be performed using techniques well known to those having skill in the art. Moreover, as will be described in detail below, the variable values 122 may be "fuzzified", for example by assigning values to bins, and embodiments of the invention may operate on the binned or otherwise fuzzified values.

As illustrated in FIG. 1, in some embodiments of the present invention, a first layer 191 may include a first associative memory 140 and a novelty detection Block 130. An optional second layer 192 may include a second associative memory 160 and a failure mode learning Block 150. Finally, an optional third layer 193 may include a third associative memory 180 and an intervention learning Block 170. Each of these layers 191-193 will now be described in general, followed by more detailed description.

In general, the novelty detection Block 130 is responsive to the plurality of sensors 120, and is configured to repeatedly observe into the first associative memory 140 states of associations among the variables 122 that are repeatedly monitored, during a learning phase. The novelty detection Block 130 is further configured to thereafter imagine at least one state of associations among the variables 122 that are monitored relative to the states of associations that are observed in the first associative memory 140, to identify a novel state 132 of associations among the variables 122. In some embodiments, the novelty detection Block 130 is further configured to determine whether the novel state 132 is indicative of normal operation or of a potential abnormal operation. Moreover, if the novel state is indicative of normal operation, the novelty detection Block 130 may be further configured to observe the novel state into the first associative memory 140. As was also described above, the novelty detection Block 130 may be further configured to assign the variables that are repeatedly sensed into bins and/or to otherwise fuzzify the variable values, and to repeatedly observe into the first associative memory 140 states of associations among the binned or otherwise fuzzified values during the learning phase.

Continuing with the description of FIG. 1, in the optional second layer 192, the second associative memory 160 includes therein associations of attributes of failure modes of the physical system 110. A failure mode learning Block 150 is responsive to the novelty detection Block 130 and to the second associative memory 160, and is configured to imagine attributes of the novel state 132 relative to the associations of attributes of failure modes of the physical system that are observed in the second associative memory 160, to identify a potential failure mode 152 for the physical system 110, and thereby provide failure diagnostics and/or prognostics.

More specifically, in some embodiments of the invention, the failure mode learning Block 150 can include a failure mode identification and diagnostics Block 154 and a trend learning and prognostics Block 156. The second associative memory 160 contains attributes of previously experienced failure modes that are observed during "strife" (stress-life) testing, are observed during training and validation, and/or are observed during operation and identified as failure modes by experts, as well as contextual attributes. When a novel state is observed by the novelty detection system 130 this state is observed into the second associative memory 160 by the failure mode identification and diagnostics Block 154, to identify the potential failure mode based on previously learned failure modes. When the second associative memory 160 contains time-stamped attributes of previously observed failure modes, the trend learning and prognostics Block 156 is able to predict time to-failure and other prognostics.

In other embodiments, the failure mode learning Block 150 may be further configured to identify a potential new failure mode for the physical system 110 when the failure learning mode is not able to correlate attributes of the current potential failure trajectory with failure modes contained in the second associative memory 160. The difference between degradation and failure modes on one hand and benign operational changes (e.g., aging) may be based on an interpretation process that may rely both on associative memory learning of patterns of previously experienced failure modes and expert experience. Based on the imaginings of the failure mode learning system and expert experience, the state space of normal operations can be updated in the novelty detection Block 130 for future state tracking.

Still referring to FIG. 1, the optional third layer 193 may include the third associative memory 180 that includes therein associations of attributes of corrective actions and/or responses to failure modes of the physical system 110. An intervention learning Block 170 is responsive to the failure mode learning system 150 and to the third associative memory 180, and is configured to imagine attributes of the potential failure mode 152 relative to the responses in the third associative memory, to identify a potential corrective action and/or response 172 to the potential failure mode.

More specifically, in some embodiments of the invention, the third associative memory 180 contains attributes of experienced failure modes, successful corrective actions or responses, associated mean-times-to-failure and contextual attributes and is configured to make correlations between failure mode attributes and corrective responses that can be implemented to return the physical system 110 to the normal operating regime. In the event of a potential failure, the intervention learning system 170 observes into the third associative memory 180 the attributes of the current potential failure mode to imagine a recommendation of a corrective action or response 172 that can return the physical system 110 to design-intended operating conditions.

In some embodiments, the intervention learning Block 170 is further configured to apply the potential response 172 to the physical system 110 in real-time, as shown by dashed arrow 174. In other embodiments, the novelty detection system 130, the failure mode learning system 150, the intervention learning system 170 and the first, second and third associative memories 140, 160 and 180 all operate on the physical system 110 in real-time, to thereby provide real-time diagnostics, which may include real-time prognostics.

Additional detailed description of the various blocks of FIG. 1 will now be provided in connection with FIGS. 2-11. In particular, some embodiments of the invention can extend the operational capabilities of current diagnostics and prognostics for monitoring, interpreting and predicting the health of complex physical systems. By implementing novelty detection, some embodiments of the invention are capable of real-time state learning for the purpose of identifying system states that are novel (outside the "normal" baseline, and potential performance degradation indicators) as well as identifying system states associated with previously learned failure modes. During a validation, learning or training mode, novelty detection learns normal (baseline) system behavior over a range of design-intended operational regimes using a non-symbolic, associative memory. During an operational mode, these patterns of system-specific, normal behavior are used as a reference for identification of novel and potential failure states that may warrant attention and/or corrective action. Corrective action can be autonomous and/or human-implemented. As was described in FIG. 1, the novelty detection and prognostics/diagnostics capability may be implemented in a layered learning framework.

Thus, some embodiments of the invention can recognize previously unobserved or "novel" system behavior that may be associated with a potential failure state before failure occurs. In some embodiments, the novelty detection Block 130, also referred to as a novelty detection engine, learns normal system behavior that is consistent with design-intended performance specifications during training. As used herein, any system behavior that is consistent with the design-intended performance specifications may be considered to be normal behavior. A normal baseline may be established during standard product test and validation. During use, newly observed system states are compared with (imagined) a learned associative memory of normal states in order to identify behavior that is "novel" and possibly associated with a failure state or performance degradation trend potentially leading to future failure (prognostics). Novelty detection can incorporate a non-symbolic and memory efficient associative memory technology that is capable of very fast real-time state learning.

Embodiments of the invention need not use physical models or pre-determined normal limits to sensor values. Further, embodiments of the invention can be real-time capable and, thus, adaptable to dynamic system behaviors. Other conventional techniques often compare the observed values of the current system state with known failure modes or with previously experienced failure states of similar systems obtained by "strife" (stress-life) testing during product development. In contrast, embodiments of the invention need not rely on a prior knowledge of known failure modes, but rather can assess the "novelty" of a current state by comparing it to an associative memory of learned normal behavior that may include not only system variables but also may include contextual information related to the operating environment. By comparing current in-use performance with learned normal performance as captured in a design-intended performance envelope and/or learned trends to failure, it is possible to discern and anticipate potentially fatal trajectories during system operations that may be obtained during strife (stress-life) testing and/or physical system operations and training.

In human cognition, an observed system state is new or "novel" if it has not been observed in the past or has not been installed in human memory. Similarly, in exemplary embodiments of the invention, the novelty of an observed state may be assessed against the backdrop of previously observed and learned system states that have been accumulated (observed) in an associative memory, such as associative memories 140, 160 and/or 180 of FIG. 1. As with human learning, this associative memory is built through "experiential" leaning in which a newly observed state is accumulated in the associative memory as a basis for interpreting future events.

For the purposes of the discussion below, the health of a physical system may be characterized by the simultaneous and time-stamped combination of significant outputs 122 of sensors 120 of the physical system 110 and their relationships, plus any sensed contextual variables related to the physical environment that might affect system performance. Over a period of time, the accumulation of these multi-parameter sensor outputs, any derived variables, and/or contextual variables can determine an n-dimensional state space in the first associative memory 140 that represents the behavior of the physical system. Embodiments of the invention, thus, are able to learn through experience, one time-stamped observation of simultaneous sensor readings at a time. These observations may then be filtered through a significance filter that may be included in the novelty detection Block 130, as being consistent with design-intended expectations, or inconsistent with design-intended expectations, and thus subject to further interpretation and response.

In some embodiments, the resulting state space that is observed in the first associative memory 140 can serve as a basis for evaluating future states. Newly observed states that do not belong to this state space are considered to be novel states 132 and may (or may not be) associated with a failure mode or a trend towards failure. For example, the direction and rate at which a sequence of observed states moves away from the state space can be used to help predict failure patterns and time-to-failure.

The state space that is observed in the first associative memory 140 can provide a useful tool for capturing observed relationships, or associations, between state space variables. In conventional single or multi-sensor systems, individual sensor values are tracked to assure that they stay within pre-determined limits. However, system-level malfunctioning may occur even if all individual sensor outputs are within limits, due to inconsistent correlation of sensor outputs. By defining the time-dynamic state of a system as the complete time-stamped set of sensor outputs according to some embodiments of the invention, one can compute the correlated behavior of individual sensor values in defining the acceptable state space. Moreover, in some embodiments, pattern completion may also be used, for example, in the case of a sensor failure.

Further, novelty detection according to some embodiments of the invention can reflect system-specific behavior on the premise that more efficient and reliable prognostics can be achieved by comparing system-specific multi-sensor states to a system-specific learned normal baseline, rather than a platform-based generic performance baseline. Novelty generally has limited meaning for specific system diagnostics and prognostics when based on averages over multiple system performance histories, because a novel state for one system may not be novel for another system under the same or different operating conditions.

In some embodiments of the invention, the ability to implement novelty detection may be enabled by a type of machine learning called associative memory 140, for example associative memory technology developed by Saffron Technology, Inc., Morrisville, N.C. This associative memory technology is described in U.S. Pat. No. 6,581,049 entitled "Artificial Neurons Including Power Series of Weights and Counts That Represent Prior and Next Association", U.S. Pat. No. 7,016,886 entitled "Artificial Neurons Including Weights That Include Maximal Projections", U.S. Patent Application Publication No. 2005/0163347 A1, published Jul. 28, 2005, entitled "Distance-Based Spatial Representation and Prediction Systems, Methods and Computer Program Products for Associative Memories", U.S. Application Publication No. 2006/0095653 A1, published May 4, 2006, entitled "Network of Networks of Associative Memory Networks for Knowledge Management", U.S. application Ser. No. 11/035,472, filed Jan. 14, 2005, entitled "Methods, Systems And Computer Program Products For Analogy Detection Among Entities Using Reciprocal Similarity Measures", application Ser. No. 11/196,871, filed Aug. 4, 2005, entitled "Associative Matrix Methods, Systems and Computer Program Products Using Bit Plane Representations of Selected Segments" and/or application Ser. No. 11/426,520, filed Jun. 26, 2006, entitled Nonlinear Associative Memories Using Linear Arrays of Associative Memory Cells, and Methods of Operating Same, the disclosures of which are hereby incorporated herein by reference in their entireties as if set forth fully herein. These patents and applications may be referred to collectively herein as the Saffron Technology. Associative memories 140, 160 and/or 180 may include the Saffron Technology and/or other conventional associative memory technology.

An associative memory can allow storage, discovery, and retrieval of learned associations between extremely large numbers of attributes in real-time. At a most basic level, an associative memory stores (observes) information about how attributes and their respective features occur together.

The predictive power of the associative memory technology comes from its potential ability to efficiently interpret and analyze the frequency of these co-occurrences and to produce various metrics in real-time.

In some embodiments of the invention, a first associative memory 140 can contain stored information about previously observed system states (such as sensor outputs within a context) as "counts" between co-occurring sensor value pairs, or attribute combinations, across all observations. As new system states are observed, this co-occurrence matrix is incremented and the "strength" of correlations across the sensor variables is reflected in the increasing number of counts of observed co-occurring value combinations. As in human learning, this memory of learned associations and experience can be queried (imagined) as a basis for interpreting the significance of new system states and identifying recommended responses as described above.

In the case of large complex systems involving up to hundreds, thousands or more of sensors transmitting at small time-steps, the size of the co-occurrence matrix may quickly become intractable and unsuitable for real-time applications using classical data mining and model-fitting approaches. Other approaches may compress the memory to reduce storage requirements, but may require that the memory be uncompressed to add new observations or to respond to queries. By allowing learning in a compressed state, however, the associative memory is able to learn extremely quickly-enabling fast state learning for real-time prognostics and diagnostics. By virtue of the above-cited Saffron Technology, Saffron's implementation of associative memory has been demonstrated to be able to handle up to one million or more attributes.

The ability of associative memory to handle extremely large and complex datasets makes it well suited for real-time prognostics applications as well as for large-scale diagnostics tasks. For example, using associative memory it is possible to simultaneously monitor the operational performance of a fleet of vehicles in order to observe broad trends in system-wide behavior. Conventional techniques may not be able to interpret hundreds of thousands of attribute values in real-time (along with contextual variables) such as would be used to monitor a fleet of vehicles operating in different regimes and environments.

The state space of accumulated sensor and contextual values that is accumulated in the first associative memory 140 by the novelty detection Block 130 obtained during training, under both normal and in-use operations, may be represented in a construct referred to as the design-intended performance envelope. The disposition of a new observation with respect to both novelty and normality is a function of its "closeness" to the design-intended performance envelope. A new observation is novel if it falls sufficiently outside the envelope. Similarly, a new observation is normal if it falls within the envelope or "close enough" to it. The design-intended envelope is typically established based on exercising the system 110 within the intended design envelope, e.g., during a test and validation phase.

Figure 2A:
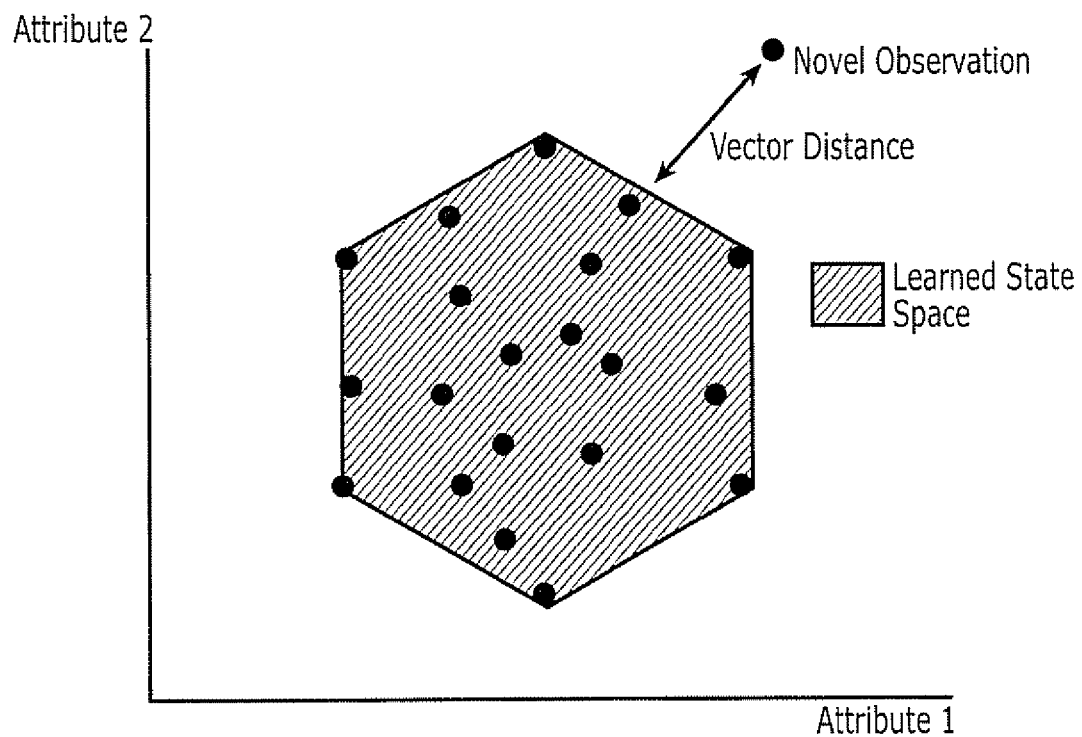
FIG. 2A conceptually illustrates determining a novel observation by vector distances according to some embodiments of the present invention.

There are a number of ways to assess the "closeness" of a new observation. One direct approach would be to compute the n-dimensional vector distance between the most recent observation and the closest point on the state space frontier, as illustrated in FIG. 2A for a simple two-attribute problem and 20 observations. Computing this metric may be computationally time-consuming when the state space is defined by an extremely large number of observations and attributes.

According to other embodiments of the invention, an alternative approach may be used that may be better aligned with the machine representation of associative memory 140 as a matrix of co-occurrences of attribute values. In particular, some embodiments of the invention may approach the building of the design-intended performance envelope as a "covering" problem. The fullest possible range of attributes is mapped into bands, in essence creating fuzzy sets of attribute values. Enumerating all possible combinations of bands produces a set of "bins" that can fully cover the potential normal performance envelope.

The use of fuzzy values instead of scalar data to represent system states can be consistent with the particular way associative memory understands and represents data. An associative memory may not understand the semantics of the values that it stores. Rather, it may understand them as symbols, and the matching it does may be based on matching of symbols. For example, suppose a set of values is observed as (23.4, 10.8, 2.5). An associative memory may not determine that (20.6, 12.5, 1) is nearer than (29.23 16, −8). Both vectors are new values that haven't been seen before. Similarly, the vectors (20.6, 12.5, 1.44) and (20.6, 12.5, and 1.42) may not be recognized as the "same" value to one significant digit. The use of fuzzy sets can avoid the potential problem of requiring an associative memory to recognize both scalar values and ordinal relationships. The covering approach can provide an elegant way for the memory to store observed system states as "counts" between co-occurring sensor values or attributes.

Figure 2B:
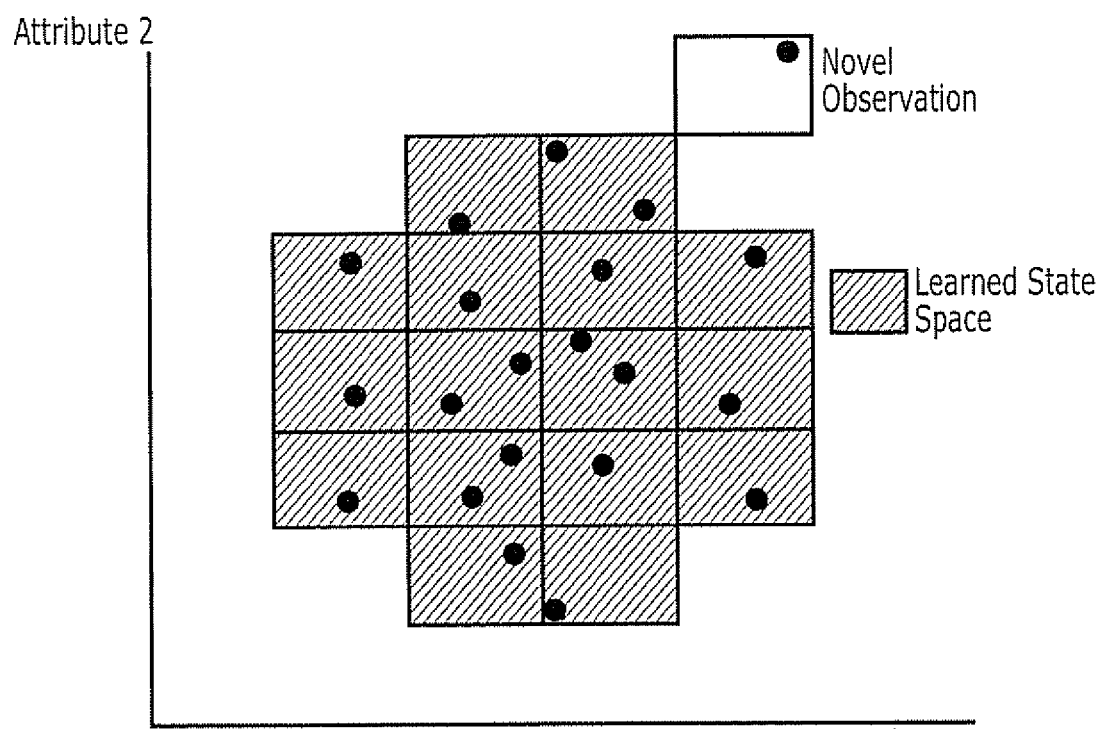
FIG. 2B conceptually illustrates determining a novel observation by bin covering according to some embodiments of the present invention.

An example is shown in FIG. 2B. This figure shows the same simple two-attribute problem as FIG. 2A. Before the data are fed to the associative memory, they are preprocessed into bands or bins as described above. Collectively, the adjoining bins define the normal design-intended performance envelope. The size of the bands may be determined such that, during training, one might expect the 2-dimensional space of normal behavior to be well covered by observed values. The bins need not be of the same size. More than one observation may fall into one bin. The dimensions of the bins and the length of training may be determined a priori by an analyst and/or may be dynamically determined. Typically, with longer training periods, smaller bin sizes will fully cover the normal envelope, but this may depend on the specific dynamics on the physical system. With adequate training, it is possible to increase or maximize the possibility that all normal states are observed by adjusting the granularity of the bin size.

An accurate map of system-operating-within-the-design-intended-performance-envelope and the observed sensor states may be desirable for the integrity of the system. In some cases, independent performance indicators may be used. For example, during training, the system can be instrumented with performance tracking capabilities, for example using a dynamometer, noise and vibration tracking equipment, etc. These instruments would confirm that the observed states represent normal states. Further, during training, the physical systems should be operated in all operating regimes that might be expected. For example, in the case of a car engine one might include start-up mode, as well as acceleration, deceleration and so forth.

During training, the behavior of the physical system is assumed to be normal, subject to the discussion above, and all observed values are added (observed) to memory unless it is determined that there is a likelihood of aberrant system behavior. During use, newly observed novel states may or may not be normal. Novel states that indicate possible future failure (a "potential failure") can be characterized by variables such as the speed of a shift away from the normal performance envelope, the magnitude of shift, and/or the persistence of the shift. The determination of these variables may be made based on a priori assessment of the dynamic behavior of the system and/or may be determined dynamically. Appropriate policies (such as alerts to operators) may be implemented as rules within the novelty detection Block 130. Those novel states identified as not normal or indeterminate may be passed for further analysis as described below.

In some embodiments, observed states may be grouped by the novelty detection Block 130 into three types: 1) novel and normal; 2) novel and not normal; and 3) novel and indeterminate. These three types are discussed below.

Figure 3A:
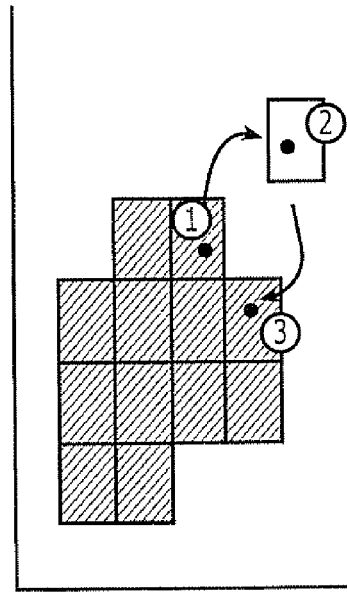
FIGS. 3A-3D illustrate various examples of assessing novel states according to some embodiments of the present invention.
Figure 3B:
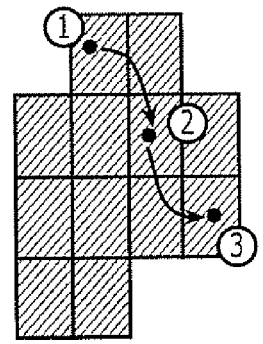

Type 1: Novel and Normal. As shown in FIG. 3A, a novel state may indicate an external shock which momentarily throws the system into a new behavioral regime, but which returns to normal behavior quickly. This transient shock dissipates with no lingering effect on system behavior. Alerts might not be necessary in these situations. Alternatively, as shown in FIG. 3B, the newly observed state is clearly inside the normal performance envelope but is novel simply because the system has not "hit" that bin during training. If such an observation is followed by one or more states that also fall within the normal performance envelope, it is likely that the system is behaving normally.

Figure 3C:
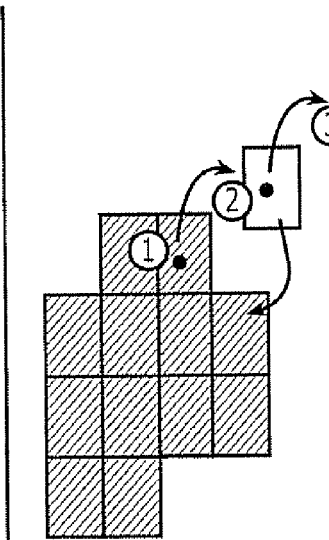

Type 2: Novel and Not Normal. Novel states that are not normal may be indicated by a number of different behaviors. Non-normal behavior might be manifested by the rapid divergence of observed states from the normal performance envelope. As shown in FIG. 3C, repeated observation of novel states with sudden and sustained movement away from normal performance envelope might represent a shift to a new and persistent abnormal operating regime.

Figure 3D:
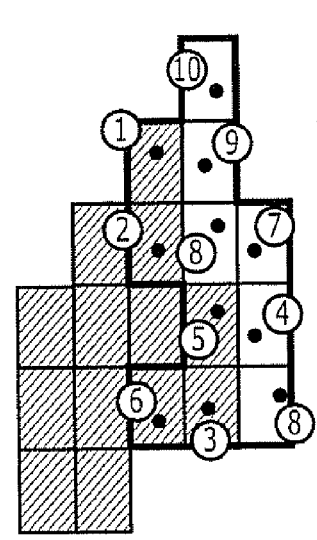

Type 3: Novel and Indeterminate. Indeterminate behaviors, as shown in FIG. 3D, manifest themselves as random sequences of novel and not novel states that result in the migration of the performance envelope. Depending on the nature of the sequence, this might indicate a new environmental regime which quickly stabilizes, or might indicate normal aging of the system which was not captured during training. These behaviors and rule sets may be worked out in advance by an expert who is extremely familiar with the operating characteristics of the physical system and/or may be derived dynamically. Novelty detection Block 130 according to exemplary embodiments of the invention can consider the context of a system's behavior in the assessment of its performance. These contextual attributes may assist in assessing whether a novel state is normal or not normal, and also the root cause of failure. The learning process can also observe clustering of states within a state envelope. Such clusters may provide valuable information in at least two ways: (1) a shift of such clusters may indicate an environmentally induced change in system behavior (desert heat or high altitudes), or (2) a degradation trend towards failure.

Some embodiments of the invention can use the novelty detection engine 130 for real-time diagnostics/prognostics. Adaptive real-time control also may be provided, as illustrated by dashed arrow 174 of FIG. 1, to the extent that may not be possible in previous approaches.

Figure 4:
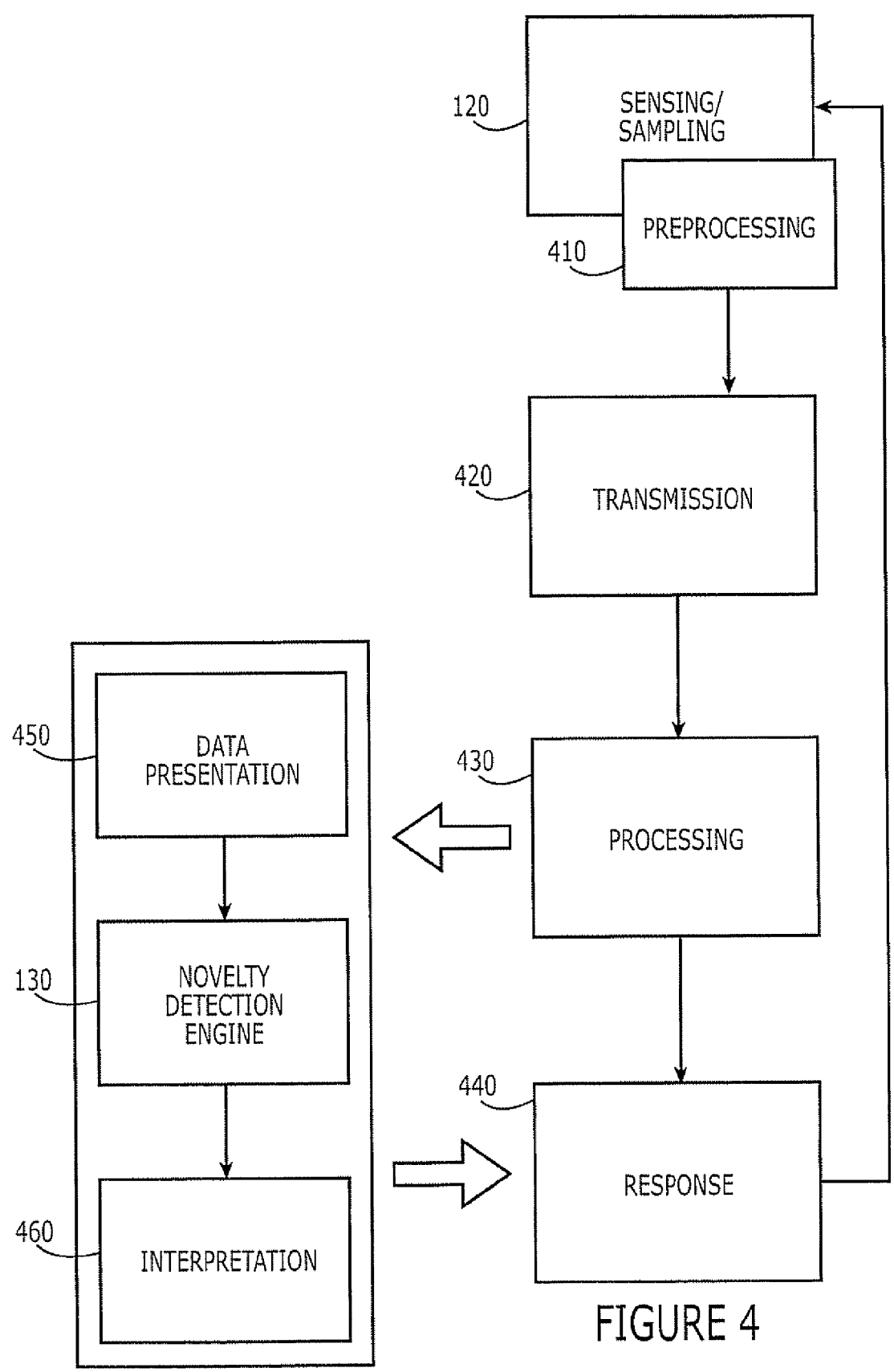
FIG. 4 is a block diagram of novelty detection systems, methods and computer program products according to other embodiments of the present invention.

FIG. 4 illustrates a novelty detection Block 130 embedded in a feedback loop comprised of four functionalities: sensing 120, transmission 420, processing 430 and response 440. Each of these four functionalities will now be described.

Sensing Block 120 was described earlier in connection with FIG. 1. As discussed earlier, the state-space approach assumes that the state (i.e., health) of a physical system can be characterized by the simultaneous and, in some embodiments, time-stamped combination of significant sensor outputs 120 of a physical system 110. In a noise-rich environment, preprocessing 410 may be used to extract meaningful data from sensed data and signals. The preprocessor 410 can translate sensored data into meaningful attributes that can be interpreted by the associative memory 140, and can build a context for these attributes. For example, vibrational signatures may be best dealt with through some form of spectral analysis such as a Fast Fourier Transform. Some data may be represented as fuzzy values or sets that can be expressed as linguistic variables. Contextual attributes might include operating conditions such as temperature, pressure or altitude.

Sensed (and, in some embodiments, pre-processed) data is transmitted by the transmission Block 420 to the processing Block 430 for interpretation. In many modern systems, a data bus protocol such as CAN (Controller Area Network) or one of its derivatives may be used for sensor information transmission 420 to process modules in real-time, i.e., fast enough to keep up with control cycles. In principle, embodiments of the invention can pull sensor data from a central processor, distributed modules, and/or plug directly into a data bus.

The processing Block 430 represents the intelligence of any system controller or logistics support function. It comprehends monitoring the system controller, data processing, and analysis, if a closed-loop feedback controller is used, as well as actuation outputs. In some embodiments of the invention, the processing function 430 can be enhanced by the real-time implementation of learning and novelty detection.

The response Block 440 can respond to outputs of the novelty detection engine 130, in some embodiments of the invention. Some embodiments of the invention can provide a real-time response. In particular, while the execution time of an action called for by a control function may not be reduced beyond that dictated by physical limits (e.g., milliseconds to inject fuel into the intake manifold of an automobile engine or hours to deliver spare parts from a warehouse to a maintenance location), the time taken to compute actions based on sensor inputs may be a function of the computational speed of the controller. Accordingly, real-time in this context can mean fast enough to keep up with the physical system, which might be quite slow in a chemical factory, but much faster in electronic fuel injection. Alternatively, in a real-time control application where the observed states might be used for real-time adaptive control (e.g., parametric adjustments for altitude and such), the real-time computation should be fast enough to keep up with the parametric correction, which might be much slower than the actual feedback control loop update interval itself. Finally, for corrective action to diagnostics and prognostics indicators, the alert to all stake holders (operator, maintenance, spare parts, engineering, R&D, etc.) may be in near real-time and near simultaneous, but the time required for execution may be orders of magnitude higher. For example, a real-time alert may be issued to make a part available at a specific location to repair an aircraft engine after landing. However, actually transporting the part will take time. The triggering action, however, may take place in real-time.

By recognizing potential performance degradation and associated trends in real-time, a control system according to some embodiments of the invention, be it a logistics support function or an internal combustion engine, can drive corrective response almost immediately. Appropriate correction can thus be accomplished in near real-time in some embodiments of the invention, and can be compared with classical techniques where data downloads and off-line data processing may need to be performed before corrective action can be taken.

Continuing with the description of FIG. 4, the novelty detection engine 130 builds (i.e., learns) a normal (i.e., performance-as-intended) state-space baseline that can serve as a reference for recognition of novel (i.e., previously unobserved) system states. Moreover, subsequent interpretation (Block 460) of these new states may be provide indicators of either impeding failure or parametric shifts due to aging and/or external factors for which human attention and/or parametric updates may be desired. Data presentation Block 450 may be used to format the data in a manner that can be used by the novelty detection engine 130.

Figure 5:
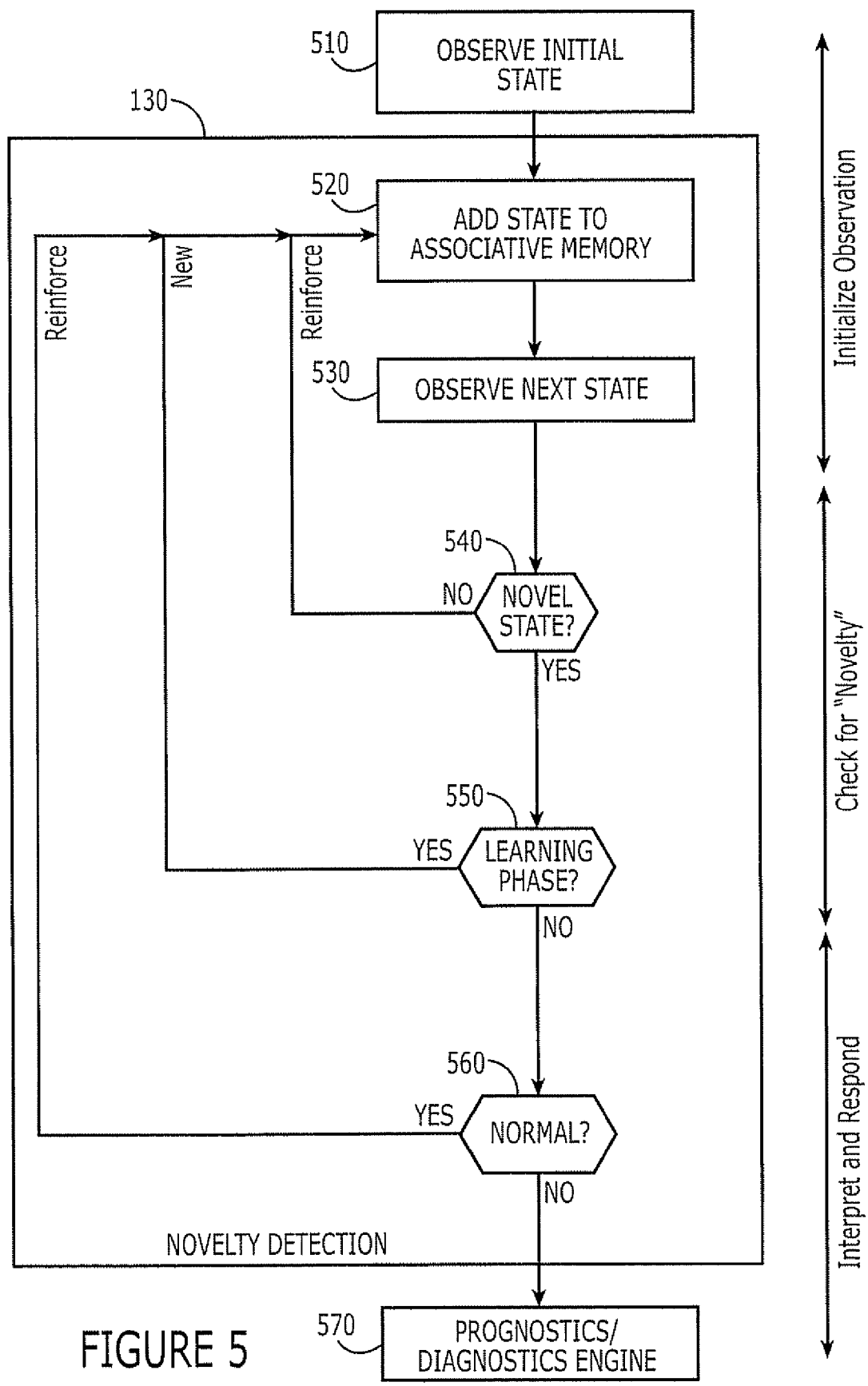
FIG. 5 is a flowchart of operations that may be performed for novelty detection according to some embodiments of the present invention.

FIG. 5 is a flowchart of operations that may be performed by a novelty detection Block 130 of FIGS. 1 and/or 4, according to various embodiments of the present invention. As shown in FIG. 5, an initial system state is observed at Block 510 to initiate learning and building of the first associative memory 140. Two phases of state learning may be defined: training and in-use operation. An associative memory 140 of normal behavior is built during a training (i.e., test and validation) period during which the system learns what is normal for that particular system and environment with independent verification of normal performance. Memory building and learning may also continue to occur during in-use operation.

It is assumed that the system 110 is operating normally during training as verified through independent observation (e.g., user assessment and/or independent performance testing). The length of the training phase may depend on the dynamics of the system 110 under consideration, and may be comparable to the testing that an automobile engine might undergo in an assembly plant prior to being released for sale. While the system 110 is training it will generally encounter many novel states. The learning phase may continue sufficiently long to learn almost all normal behaviors. If a system failure occurs during learning, the process may need to be restarted for validity.

During in-use operations, novelty is assessed (as described earlier) depending on how "close" the currently observed observation is from normal learned behavior. A state is determined to be new if it is sufficiently "far away" from the design-intended performance envelope accumulating in associative memory. Again, not all novel states encountered during use are non-normal and associated with failure modes. When a novel state is detected, it is first interpreted. Based on an accumulated history of experienced system-specific failures accumulated during operation, the novel states are characterized as either (1) normal behavior (i.e., no history of associated failure) or performance shifts due external influences that, while not normal, stabilize or return to normal; (2) non-normal behavior (based on previously experienced failure histories) for which parametric updates and/or corrective action may be desired; or (3) possible states of performance degradation that may nor may not lead to failure. Interpretation may be accomplished by the failure mode learning Block 150 and may be aided by the interpretation of human experts as was already described.

The granularity of the filter for acceptable novel states may be set by a human analyst and/or automatically depending on, for example, the nature and application of the physical system, and/or the cost of not recognizing non-normal behaviors that lead to system failure. In other embodiments, the granularity of the filter may be adaptively set by a human analyst and/or by a data processing system.

Referring to the flowchart of the novelty detection Block 130 shown in FIG. 5, an initial state of the physical system is observed at Block 510. Since no states have been previously observed, this state is a novel state and becomes the first state in associative memory 140 at Block 520. A second observation is made and checked for novelty at Block 530. If this state is identical to the previous state (i.e., not novel) at Block 540, then the associative memory is reinforced (i.e., the "counts" of co-occurring attributes are increased). If the state is novel at Block 540, then it is determined at Block 550 whether the novelty detection engine is operating in training mode or is in operational use. If the novelty detection engine is in training mode at Block 550, the observed novel state is added to the memory to build the normal performance envelope. If the system is in use at Block 550, the observed novel state is determined to be normal or non-normal at Block 560 based on a previously developed rule set described earlier. If the state can be identified at Block 560 as normal, then the associative memory is reinforced. If the state is not normal according to the previously developed rule set, or if it is indeterminate, the state is passed to the diagnostics/prognostics engine at Block 570 for further analysis.

Figure 6:
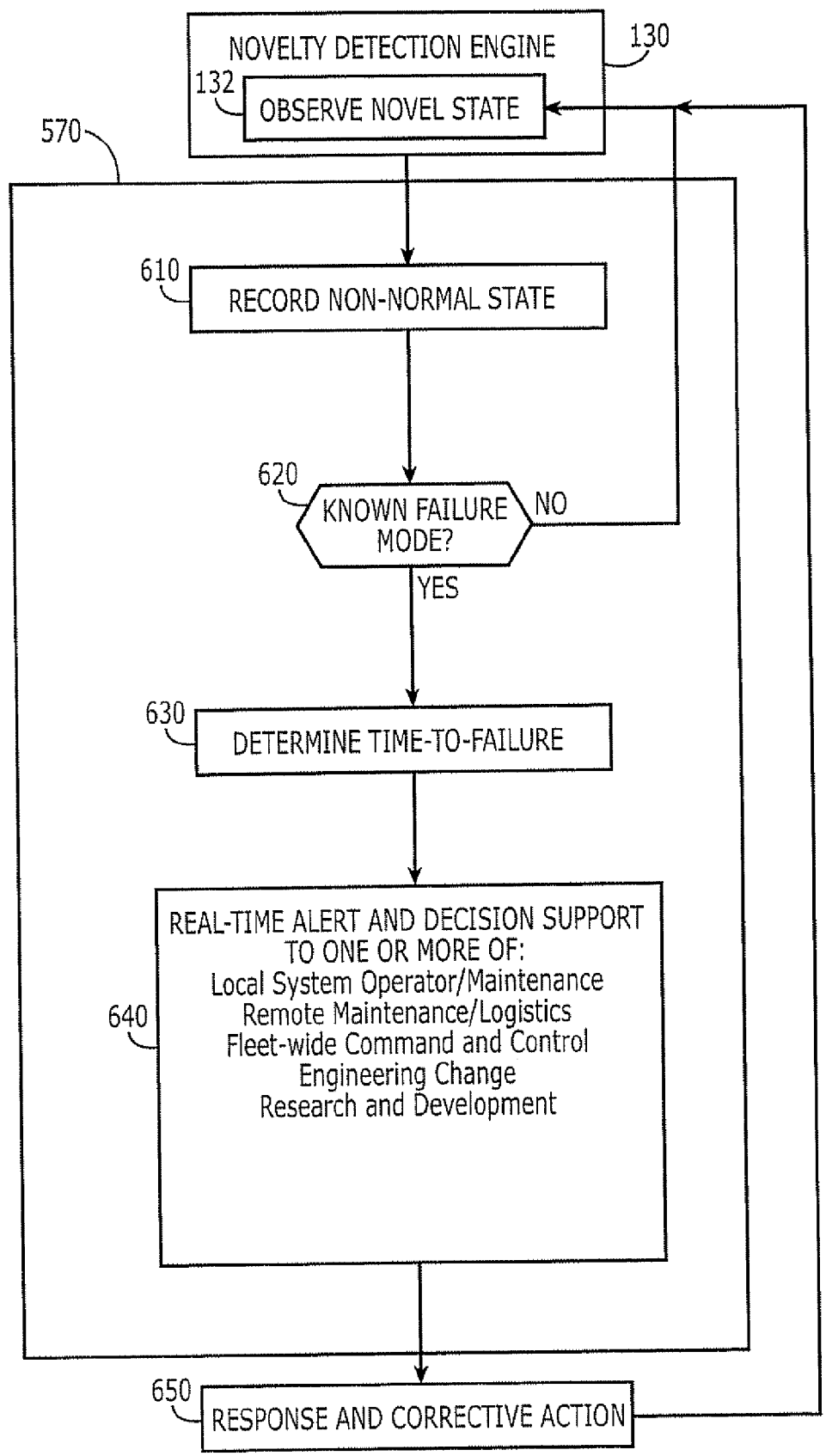
FIG. 6 is a flowchart of operations that may be performed for failure mode identification and learning, as well as trend learning for prognostics according to some embodiments of the present invention.

FIG. 6 is a flowchart of operations that may be performed by failure mode learning Block 150 and/or intervention learning Block 170, according to various embodiments of the present invention. The failure mode learning/intervention learning Blocks 150/170 may also be referred to collectively as a diagnostics/prognostics engine 570. In general, when non-normal or indeterminate states are observed, the novelty detection Block 130 passes information about the novel state to the diagnostics/prognostics engine 570 that can provide alerts to system operators who are dependent on timely awareness of current or anticipated problems, and associated needs for maintenance, network reconfiguration, and/or mission modifications. Information about the observed state may also be passed to the intervention learning Block 170 for further analysis. The intervention learning Block 170 can assist an analyst (or operator) in determining whether this is a common failure mode or one which has never been seen before-and what kind of response is appropriate. While failure mode analysis and the identification of underlying causes is often as much an art as a science, some embodiments of the invention can aid analysts by pattern completing currently observed symptoms to related failure and failure correction history for similar systems and environmental contexts.

Previously experienced failure states and contextual attributes may be contained in a library of failure modes and failure trajectories that can then be associated in a second associative memory 160 with information such as likelihood of associated failure, mean-time-to-failure, and corrective measures (as appropriate). As the history of failures is accumulated in the second associative memory 160, it is possible to correlate observed performance problems to previously captured failure mechanisms and their resolution as the basis for near-real-time likelihood estimation of root cause and/or recommendation for corrective actions.

In the event that the failure mode is known, appropriate corrective response can be taken. Corrective actions, mean times-to-failure, and appropriate responses can be included in the third associative memory 180, so that appropriate and previously successful remedial actions can be recommended, when similar states are observed in the future. Moreover, in the event that the observed non-normal state is not a known failure mode, or is not on a known trajectory to failure, then the operator may need to decide how to respond. The most likely choice may be to continue to observe the system, to assess the subsequent behavior until a decision can be made about possible corrective action.

Referring specifically to the flowchart of the diagnostics/prognostics engine in FIG. 6, an observed novel state 132 that is either not normal or indeterminate is passed to the diagnostics/prognostics engine 570 for further review and assessment. The state is first recorded at Block 610 in the second associative memory 160 of previously observed non-normal and indeterminate states along with any time-stamped attributes of previously observed failure trajectories. The second associative memory 160 is queried to determine whether the state is associated with a known failure mode at Block 620. If the state does not match a known failure mode, then additional states may be observed to better understand the system dynamics. If the state matches a known failure mode, then the third associative memory 180, that may also contain past responses, outcomes and/or analyst notes, may be queried for information such as estimated time-to-failure, number of previously observed similar states, operating context, previous responses, and/or outcomes, at Block 630. Depending on the results of the query, real-time alerts may be provided to the operators and response recommendations at Block 640. The real-time alerts of Block 640 may correspond to the potential response 172 of FIG. 1. At Block 650, response and/or correction action, which may correspond to the dashed arrow 174 of FIG. 1, also may be provided.

Figure 7:
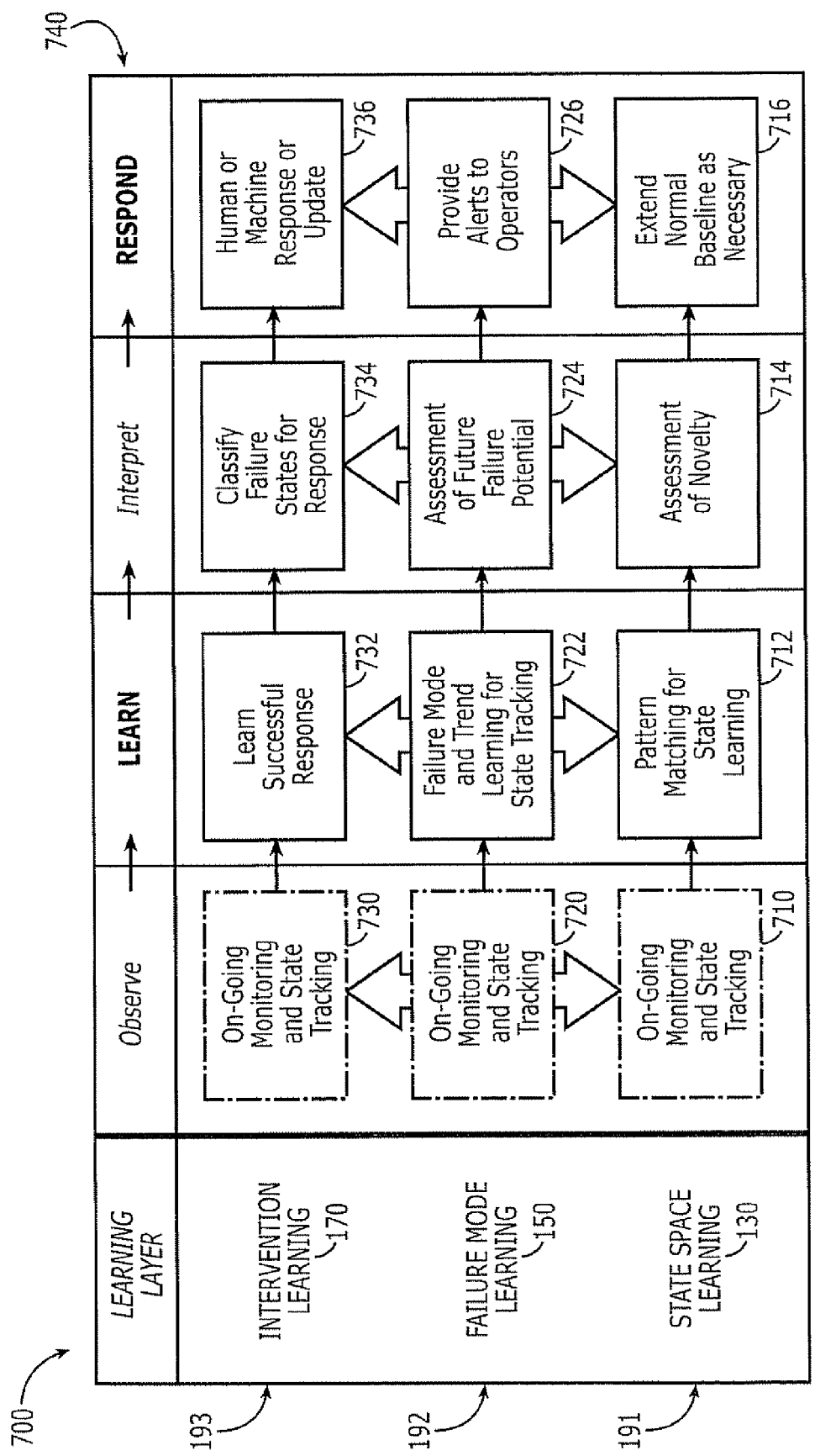
FIG. 7 is a functional block diagram of layered learning for diagnostics according to various embodiments of the present invention.

FIG. 7 is a block diagram of systems, methods and/or computer program products according to other embodiments of the present invention, and illustrates additional detail of the functional processing by the first, second and third layers 191-193 of FIG. 1. Thus, in FIG. 7, the systems, methods and/or computer program products 700 include a first layer 191 for state space learning 130, a second layer 192 for failure mode learning 150, and a third layer 193 for intervention learning 170. From a functional standpoint, each of the layers 191-193 can provide observe→learn→interpret→respond functionality at the given layer, to provide what may be referred to as a "Learn-and-Respond Loop" 740. Thus, to implement real-time prognostics/diagnostics capability for both dynamic and static systems, the Learn-and-Respond Loop 740 may be embedded within a set of nested tasks. "Layered" learning describes the paradigm in which learning occurs at different levels in a prognostics/diagnostics system, according to some embodiments of the present invention. The layers 191-193 represent a hierarchy of tasks for prognostics/diagnostics determination that transform inputs into outputs, or attributes into predictions, in the Learn-and-Respond Loop 740. Further, this "layered" learning can seamlessly integrate the learning tasks at each layer. Embodiments of FIGS. 1 and 7 can provide three layers of learning: pattern matching for state-space learning 130 to determine novelty 132; failure mode learning 150 to determine failure trends 152; and intervention learning 170 to recommend actions 172 to prevent failures. The elements of and interactions among the learning layers, according to some embodiments of the invention, are illustrated in FIG. 7 and will now be described in detail.

In some embodiments, the foundation of the layered learning is a Learn-and-Respond Loop 740 by which the design-specific performance envelope is determined, as was described earlier. For the state space learning 130, ongoing monitoring and state tracking is performed at Block 710. The accumulated sensor 120 attribute (parameter) values 122 determine a state-space in first associative memory 140 against which new states are assessed at Block 712 to determine novelty at Block 714. If the state is determined not to be novel, the design-specified performance envelope is reinforced. For an in-use operational system, most states are expected to fall within the design-specified performance envelope which is assumed to represent normal behavior. If the state is determined to be novel and normal, the normal performance envelope is extended as appropriate at Block 716. For example, the observation represented by State 2 in FIG. 3B would be added to the envelope. It is novel but clearly falls within the envelope. Thus, determination of normality can depend on the localized behavior of the system and can be assessed using a layered learning approach for failure mode tracking that observes the patterns in sequences of novel and not-novel observed states to determine whether a particular pattern can be correlated with a previously observed failure mode. In the example above, all observed states prior to and after are normal, so a rule could be learned that patterns which isolated novel states within a sequence of normal states should be interpreted as normal.

During Failure Mode and Trend Learning 150, as illustrated in FIG. 7, ongoing monitoring and state tracking also takes place at Block 720. The novel states 132 are passed to another Learn-and-Respond Loop that learns possible failure trends by matching pattern sequences of novel states with previously experienced failure modes at Block 722. An assessment is made as to potential failure 152 at Block 724 and alerts may be provided at Block 726.

During Intervention Learning 170, also shown in FIG. 7, the novel states (Block 730), learned failure modes, and successful interventions (Block 732) are passed to another Learn-and-Respond Loop that classifies failure states (Block 734) and recommends human and/or machine response (Block 736). For example, interventions might include computer-controlled adaptive parametric updates, or human maintenance interventions. During learning, correlations are made between successful interventions and failure modes. The output of the Learn-and-Respond Loop may be a recommendation for an action (e.g., ordering a repair part) or parameter adjustment (e.g., adaptive parameter adjustment in an engine controller) that has the highest likelihood of successfully returning the system to design-specified behavior.

Embodiments of the invention may have application over a range of physical systems 110 that can be distinguished in practice by the "cycle time", where cycle time refers broadly to the elapsed time to close the loop between sampling by sensors 120, transmission of sensor outputs 122, processing by the three layers 191-193, and response 172.

At one end of the spectrum, one can think of fast cycle applications such as control systems for optimizing engine performance. In the event of fast cycle times, learned parameter adjustments can be made in real-time (e.g., on the order of seconds or milliseconds) to keep the system operating within normal boundaries. If real-time fixes should be made, control parameters can be tuned to performance criteria in real-time and parametric changes can be initiated and electronically downloaded within the cycle time of the physical process.

At the other end of the spectrum one can think of examples like repair parts logistics in which the cycle time may be as long as hours or days, and the response time for providing the remedial action (e.g., get a spare part) of similar order. Mean-time-to-failure predictions determined from learned history of previous failures can trigger a re-supply decision for spare and repair parts that can avoid costly delays. Alerts can be provided in real-time to the various support personnel such as maintenance and logistics, as well as command and control personnel in charge of system operations.

Embodiments of the invention described herein may also have significant application over a range of physical systems that can be distinguished in practice by the whether they are dynamic or static, and the degree of computer control, as described, for example, in the following four categories: static (and quasi-static) systems, dynamic systems, computer-controlled closed loop systems and multiple complex systems. Each of these categories of systems will now be described generally.

Static and quasi-static systems, in contrast to dynamic systems, do not have interrelated moveable parts whose behavior affects the operation of other system parts. Nonetheless, the behavior of these static systems can be learned during operational use and failures can be predicted. An example of the behavior of a static system might be the fluctuations of gas pressure or oil pressure in a system. Quasi-static systems might include drive shafts in automobiles. Driveshaft failures can be attributed to one or a combination of factors. These factors can include maintenance, driver abuse, external damage, improper installation, poor driveline geometry, and the quality and strength of the components. Indicators such as increased vibrations and grinding can be monitored to predict a future failure state.

A dynamic system refers to a system whose parts are interrelated in such a way that a change in one part necessarily affects other parts of the system. Dynamic systems can be well described through the state space framework. Dynamic systems represent rapidly changing operational variables, possibly including transient phenomena. While dynamic systems, including transient behavior, can theoretically be modeled with appropriate sets of state equations, in highly complex nonlinear systems such modeling may require a reductionist approach. For such highly complex systems, some embodiments of the present invention may provide an alternative based on a learn-and-respond approach to system diagnostics and prognostics.

Computer-controlled closed-loop systems have the ability to make observations about their current state, including the environmental context, and to control some aspects of their behavior with the goal of achieving some "good" or optimal level of performance. Control is achieved by feedback within the system, i.e., by measuring the degree to which actual system response conforms to desired system response and utilizing the difference to drive the system into conformance. In response to environmental changes and/or aging, such control systems may require an adaptive feature. Some embodiments of the invention may be applied for parametric adaptation in computer-controlled closed-loop systems in response to changes in environment and/or aging.

Finally, in addition to observing the performance of a single system, some embodiments of the invention are able to simultaneously analyze the performance of multiple systems. One example might be a fleet of aircraft or automobiles with common parts and components where information about the behavior of the same part across multiple systems can enhance the failure prediction. This may be especially critical when failure events are rare and traditional statistical approaches for predicting failure may be unreliable. In addition, by including environmental attributes, it is possible to identify operating regimes that may hasten failure or wear-and-tear. In the case of a fleet of aircraft, for example, it may be possible to predict more frequent failures for aircraft flying under more stressful operating conditions. In doing so, the associative memory can assess associations between normal operating regimes in particular contexts or environments and, by extension, adjustments to mean-time-to-failure predictions based on site-specific contexts. Moreover, large-scale patterns in the failure behavior of multiple systems also may be assessed. For example, the failure history captured in the associative memory of one physical system can be used to help predict the failure potential of another system in similar environments.

EXAMPLE

Figure 8A:
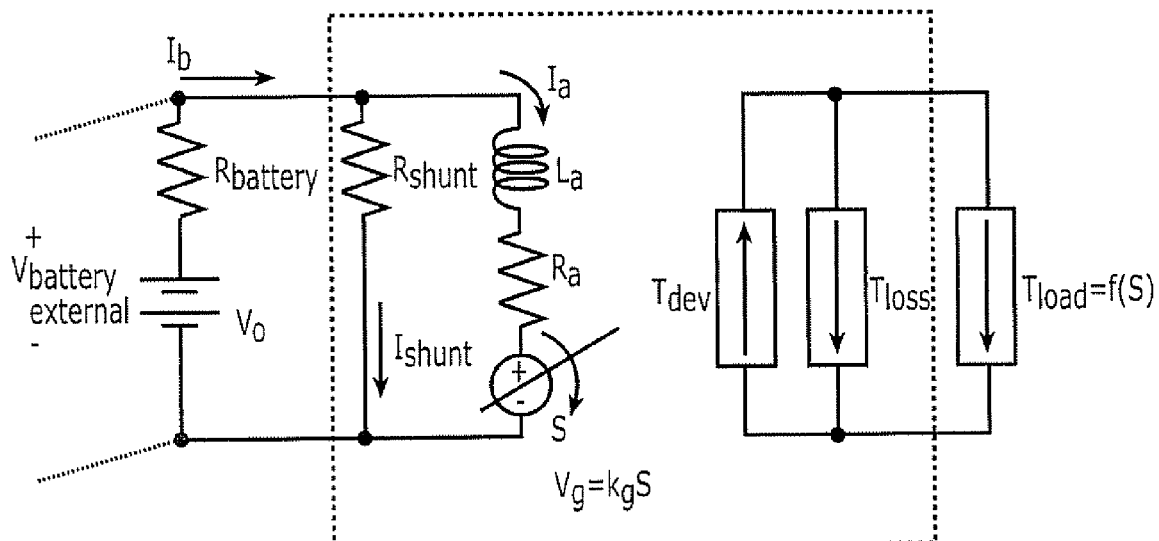
FIG. 8A is a simplified schematic diagram of a DC motor and fan.
Figure 8B:
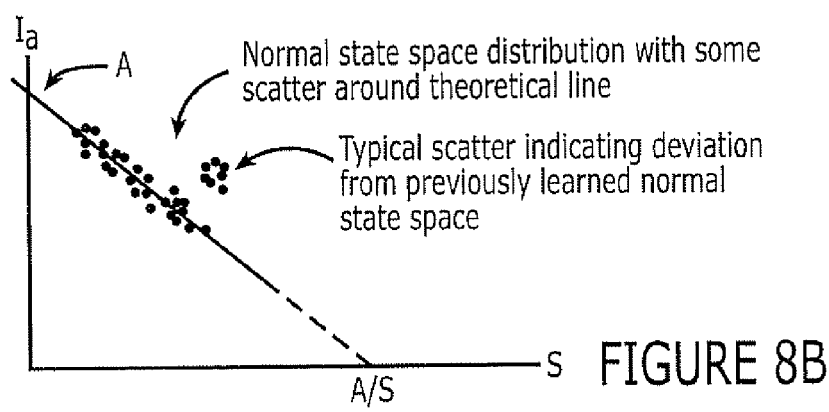
FIG. 8B graphically illustrates an equation for steady state DC operation of FIG. 8A along with a normal state-space distribution therefor and typical scatter indicating deviation from previously learned state space.

The following Example shall be regarded as merely illustrative and shall not be construed as limiting the invention. It is intentionally simple for didactic purposes. An embodiment of the present invention is described in the context of a real-time diagnostic applied to a Direct Current (DC) motor and fan as shown in FIG. 8A. The system includes a simple fan, which draws current from a battery-powered direct current motor. Four independent variables are sensored at regular intervals: temperature (T), speed (S), battery voltage (V) and battery current ($I_b$). As is well known, the governing equation for steady state DC operation relating armature current $I_a$ to speed S is $I_a = A + BS$, which defines an offset negative ramp function where the offset coefficient A represents the stall current and the slope parameter B represents the negative slope of the $I_a(S)$ curve, as shown in FIG. 8B.

Figure 9:
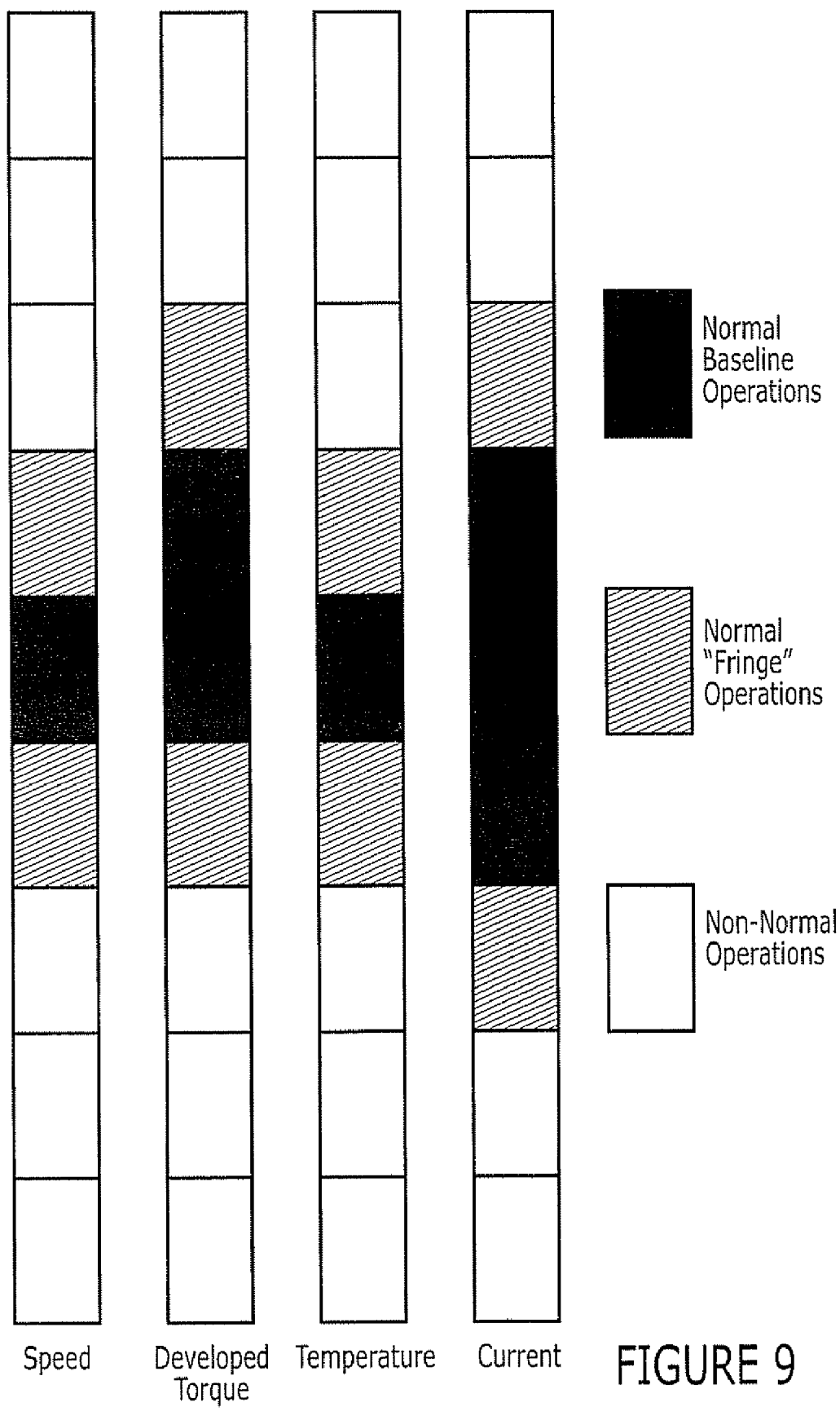
FIG. 9 illustrates an example of binning of sensor values for the fan of FIG. 8 according to some embodiments of the present invention.

Referring now to FIG. 9, ten "bands" were created for each attribute to yield a total of 10,000 possible states of behavior. The system was calibrated so that between one and three of the ten bands for each attribute can be expected to cover the normal design-intended performance envelope, as shown in FIG. 9. An additional two of the 10 bins represent normal behavior at the "fringe". The remaining four to six bins represent non-normal operations. These guidelines were intended only to assure that the processing system can accommodate the full range of experimental data. The guidelines were not intended to pre-define or limit novel or normal behavior. It will also be understood that any other banding/fuzzification scheme may be used. Sensored data from the fan may be assessed by a novelty detection engine as described herein. During training, the system rapidly converges on a normal performance envelope over the design-intended range of fan speed and associated torque loads. During operation under stable conditions, the system can be expected to perform as intended, wherein observed states fall within the normal performance envelope. Deviations from the normal performance envelope can be induced for demonstration purposes, for example by increasing operating temperature, increasing bearing-related loss torque or introducing a partial short shunt current added to the battery current. When the stress to the system is relieved, operations quickly return to normal.

Referring again to FIG. 8A, it will be understood that a demonstration that can be modeled was used for verification and didactic purposes. Embodiments of the invention need not use mathematical models. During the learning phase the observed $I_b$ (S) points will scatter narrowly (within instrumentation variability) along the shown ramp function of FIG. 8B representing the normal state space. It for example, a shunt (fault) current $I_{sh}$ (S) is introduced, the $I_b$ (S) points will fall above the ramp indicating novelty and a potential degradation as shown by non-contiguous scatter above the normal state space.

Figure 10:
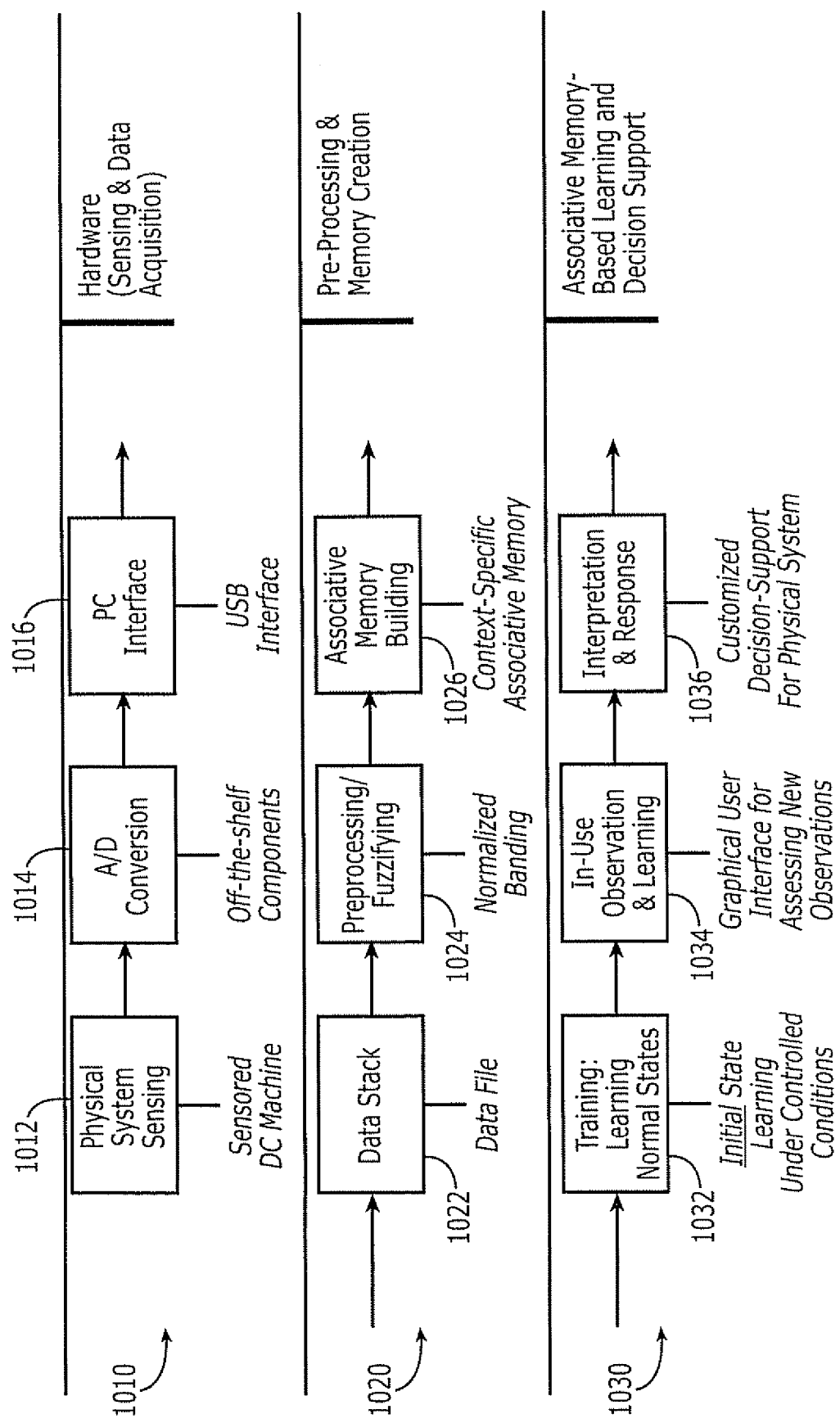
FIG. 10 is a block diagram of novelty detection systems, methods and/or computer program products according to yet other embodiments of the present invention.

FIG. 10 is a block/flow diagram representing generic hardware and software structure and interfaces for the Example. This structure provides a high-level guide to implementing some embodiments of the invention in a physical system. The structure of FIG. 10 includes hardware 1010 for sensing and data acquisition; software 1020 for pre-processing and attribute development; and associative memory, such as Saffron Technology 1030 for associative memory-based learning and decision support. The hardware 1010 can include sensing and data acquisition technology 1012 for the physical system, off-the-shelf components that perform the analog-to-digital conversion 1014 of the sensored data so that it can be interpreted by a personal computer (PC), and a PC interface 1016 that moves the data into the PC so that it can be manipulated by the Saffron Technology 1030. Once the data has been loaded into the PC as a data file 1022, it can be pre-processed 1024 as was described earlier. This may entail transforming or filtering the data so that is may be interpreted by the associative memory 1030. As part of pre-processing, data may be placed in "bins" and/or fuzzy sets at Block 1024, as was described earlier. These bins can define a system-specific associative memory 1026, including contextual data, which is ready for training and in-use operation. Finally, novelty detection and decision support functions operate to provide decision support to the analysts and operators. Normal states are learned during training at Block 1032. Novel states that cannot be identified as normal during use at Block 1034 are passed to the diagnostics/prognostics engine at Block 1036.

Novelty detection according to exemplary embodiments of the invention can offer an approach to prognostics which can identify previously unobserved or novel system states, distinguish between normal and non-normal modes of operation and/or provide alerts and recommendations for remedial action, as appropriate. Current initiatives in prognostics may assume that known baseline profiles or failure modes are available as the basis for ongoing in-use comparison. They may focus on look-up tables, and use batch downloads from the physical system to analyze system behavior. In contrast, some embodiments of the invention can use learning and novelty detection in real-time, a learned baseline represented by a design-intended normal performance envelope. While in-use, novelty detection can compare observed system behavior with the normal performance envelope. Also, the associative memory can be expandable. Information about new behavior can be added dynamically while the physical system is in-use, which can make the novelty detection smarter as time goes by.

Moreover, in some embodiments, novelty detection is implemented by the Learn-and-Respond Loop using an associative memory technology for fast state learning. While a number of technologies can be considered to "learn", including neural nets, these approaches to machine learning may suffer from computational burdens and/or modeling difficulties that may result from the need to analyze very large data sets in real-time. These potential deficiencies may limit their extensibility to real-time, prognostics and intervention applications. Associative memory technology is able to surmount these barriers through a compression technology, which enables learning in a compressed state. Associative memory technology is not only able to meet real-time speed requirements, but also can provide a transparent view of the associations between variables used for prognostics interpretation and failure learning. Further, because the technology is able to "learn" incrementally as information is encountered, it is possible to recognize temporal shifts in system performance and health.

Since learning occurs in real-time, in some embodiments, monitoring of (and, if possible, automated corrections to) performance degradation can be handled in-step with the cycle time of the process. In the case of slow-cycle applications such as logistics support with time constants on the order of minutes or hours, anticipation of failure may enable systems operators to provision spare parts where and when needed. In the case of fast cycle applications such as engine management with cycle times in the order of microseconds, real-time fault mode tracking may enable an overlay of adaptive tuning of control parameters and/or timely downloads of parametric changes. Further, as a history of failures is accumulated, some embodiments of the invention can, in real-time, correlate observed performance problems to previously captured failure mechanisms and their resolution as the basis for near-real-time likelihood estimation of root cause and/or recommendation for corrective actions.

Novelty detection according to some embodiments of the invention can be based on learned behavior for a specific physical system. Thus, it is possible to monitor and assess the unique behavior of that system without relying on average behaviors. Reliance on average behaviors can make it difficult, for example, to recognize and anticipate normal aging since aging patterns may be biased by history of individual use and may not be easily extrapolated. Consider a fleet of vehicles. A particular automobile may exhibit a particular aging profile that does not fit the expected model because the owner consistently rode the clutch. On the other hand, shared knowledge about behaviors across an entire fleet can provide useful information at the vehicle level. For example, it is not always possible able to assess whether a novel state for a particular vehicle is a potential failure mode. However, if that novel state has been associated with failure on a similar vehicle in similar operating environments, this information can be passed to an analyst for consideration.

Figure 11:
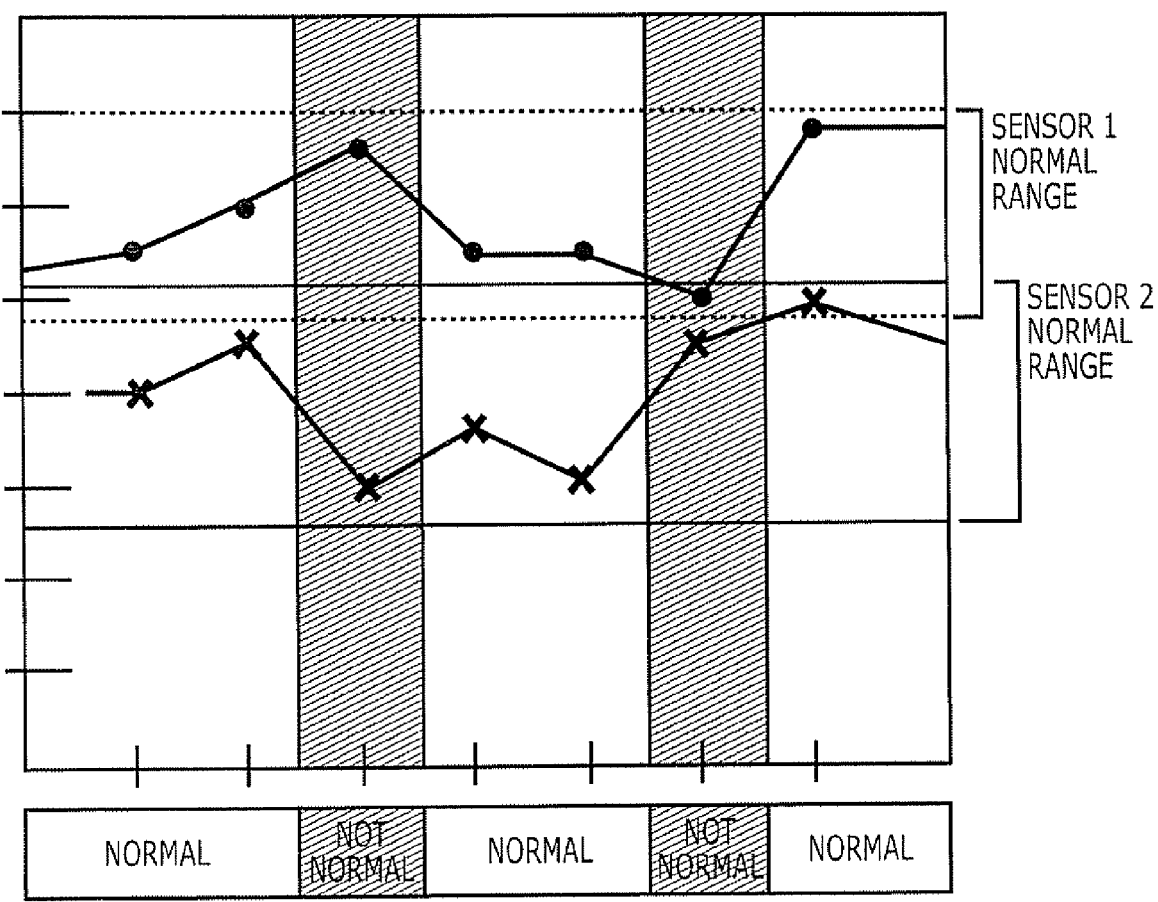
FIG. 11 graphically illustrates correlated behavior of multiple sensor values according to some embodiments of the present invention.

Typically, in single or multi-sensor systems, individual sensor values are tracked to assure that they stay within pre-determined limits. In complex systems, however, system-level malfunctioning may occur even if all individual sensor outputs are within limits. This point is illustrated in FIG. 11. The values for Sensor 1 and Sensor 2 are both within normal limits. However, using associative memory, some embodiments of the invention can recognize that the co-occurrence of sensor values that are "normal" when considered in isolation has been associated with system failure in the past. Note that no impending failure would be indicated if the sensors were being tracked individually since each is within normal limits.

Using the notion of layered learning, the prognostics/diagnostics process may be organized into a hierarchy of three tasks that utilizes associative memory technology to perform learning tasks. Three layers may be used: pattern matching for state-space learning to determine novelty (layer 191); failure mode learning to identify failure modes and predict trends (layer 192); and intervention learning to recommend actions to prevent failures (layer 193). Further, this layered learning can seamlessly integrate the learning tasks at each layer, and can allow the prognostics/diagnostics process embodied herein to operate in a semi-autonomous mode and support operators of complex physical systems who may be tasked with assuring continuous operation of these systems with design-intended parameters.

Accordingly, exemplary embodiments of the invention can offer an innovative approach to diagnostics for large, complex systems with significant practical benefits. Cost savings, performance improvements, more reliable product performance and/or less system downtime may be provided. In addition, better predictions of system-specific impending failure can lead to lower maintenance and operational costs, plus extended product lifecycles. These benefits may be attributed to the ability of some embodiments of the invention to provide earlier warning of failure, adaptive monitoring and/or fewer prediction failures as a result of the simultaneous monitoring of not only a small subset of variables related to a subsystem, but rather a large number (hundreds or thousands) of variables including contextual attributes that reflect the environment of use.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A diagnostic/prognostic system for a physical system comprising:
   a plurality of sensors that are configured to repeatedly monitor variables of the physical system during operation;
   a first associative memory;
   a novelty detection system that is responsive to the plurality of sensors and that is configured to repeatedly observe into the first associative memory, states of associations among the variables that are repeatedly monitored during a learning phase, that is further configured to thereafter imagine at least one state of associations among the variables that are monitored relative to the states of associations that are observed in the first associative memory, to identify a novel state of associations among the variables, and that is further configured to determine whether the novel state is indicative of normal operation or of a potential abnormal operation;
   a second associative memory that includes therein associations of attributes of failure modes of the physical system; and
   a failure mode learning system that is responsive to the novelty detection system and to the second associative memory and that is configured to imagine attributes of the novel state relative to the associations of attributes of failure modes of the physical system to identify and/or predict a potential failure mode of the physical system.

2. A diagnostic/prognostic system according to claim 1 wherein the failure mode learning system comprises:
   a failure mode identification and diagnostics system; and
   a trend learning and prognostics system.

3. A diagnostic/prognostic system according to claim 1 further comprising:
   a third associative memory that includes therein associations of attributes of corrective actions and/or responses to failure modes of the physical system; and
   an intervention learning system that is responsive to the failure mode learning system and to the third associative memory and that is configured to imagine attributes of the potential failure mode relative to the responses in the third associative memory to identify a potential corrective action and/or response to the potential failure mode.

4. A diagnostic/prognostic system according to claim 1 wherein the novelty detection system is further configured to observe the novel state that is indicative of normal operation into the first associative memory.

5. A diagnostic/prognostic system according to claim 1 wherein the novelty detection system is further configured to assign the variable values that are repeatedly monitored to bins, and wherein the novelty detection system is configured to repeatedly observe by repeatedly observing into the first associative memory, states of associations among the binned values during the learning phase.

6. A diagnostic/prognostic system according to claim 1 wherein the failure mode learning system is further configured to identify a new failure mode for the physical system.

7. A diagnostic/prognostic system according to claim 1 wherein the failure mode learning system is further configured to provide trend learning for prognostics.

8. A diagnostic/prognostic system according to claim 3 wherein the intervention learning system is further configured to apply the potential response to the physical system in real-time.

9. A diagnostic/prognostic system according to claim 3 wherein the novelty detection system, the failure mode learning system, the intervention learning system and the first, second and third associative memories operate on the physical system in real-time.

10. A computer program product, the computer program product comprising computer program code embodied in a computer-readable medium, the computer program code configured to provide the first associative memory, the second associative memory, the novelty detection system and/or the failure mode learning system of claim 1.

11. A diagnostic/prognostic method of a physical system the includes a plurality of sensors that are configured to repeatedly monitor variables of the physical system during operation, the diagnostic/prognostic method comprising:
   repeatedly observing into a first associative memory, states of associations among the variables that are repeatedly monitored, during learning phase;
   imagining at least one state of associations among the variables that are monitored relative to the states of associations that are observed in the first associative memory to identify a novel state of associations among the variables;
   determining whether the novel state is indicative of normal operation or of a potential abnormal operation; and
   imagining attributes of the novel state relative to associations of attributes of failure modes of the physical system in a second associative memory to identify and/or predict a potential failure mode for the physical system.

12. A diagnostic/prognostic method according to claim 11 further comprising:
   imagining attributes of the potential failure relative to associations of attributes of responses to failure modes of the physical system in a third associative memory to identify a potential corrective action and/or response to the potential failure mode.

13. A diagnostic/prognostic method according to claim 11 wherein imagining attributes of the novel state relative to associations of attributes of failure modes of the physical system comprises determining failure trends and predictions relative to associations of time-based attributes of failure modes of the physical system.

14. A diagnostic/prognostic method according to claim 11 further comprising:
   observing the novel state that is indicative of normal operation into the first associative memory.

15. A diagnostic/prognostic method according to claim 12 further comprising:
applying the potential response to the physical system in real-time.

16. A diagnostic/prognostic method according to claim 12 wherein identifying a potential response to the future failure potential is performed on the physical system in real-time.

17. A computer program product, the computer program product comprising computer program code embodied in a computer-readable medium, the computer program code configured to perform the method of claim 11.

* * * * *

UNITED STATES PATENT AND TRADEMARK OFFICE
CERTIFICATE OF CORRECTION

PATENT NO.      : 7,333,917 B2                                              Page 1 of 1
APPLICATION NO. : 11/463448
DATED           : February 19, 2008
INVENTOR(S)     : Greis et al.

It is certified that error appears in the above-identified patent and that said Letters Patent is hereby corrected as shown below:

Column 24, Claim 11, Line 31:  Please correct "the includes"
                                            To read -- that includes--

Signed and Sealed this

First Day of July, 2008

JON W. DUDAS
*Director of the United States Patent and Trademark Office*